United States Patent
Burns et al.

(10) Patent No.: US 8,154,588 B2
(45) Date of Patent: Apr. 10, 2012

(54) PARTICIPANT AUDIO ENHANCEMENT SYSTEM

(76) Inventors: Alan Alexander Burns, Portola Valley, CA (US); Richard Pivnicka, Woodside, CA (US)

( * ) Notice: Subject to any disclaimer, the term of this patent is extended or adjusted under 35 U.S.C. 154(b) by 0 days.

(21) Appl. No.: 12/687,815

(22) Filed: Jan. 14, 2010

(65) Prior Publication Data
US 2010/0177178 A1    Jul. 15, 2010

Related U.S. Application Data

(60) Provisional application No. 61/205,047, filed on Jan. 14, 2009.

(51) Int. Cl.
| H04N 7/18 | (2006.01) |
| H04R 3/00 | (2006.01) |
| H04R 29/00 | (2006.01) |
| G06K 9/00 | (2006.01) |
| H04B 1/06 | (2006.01) |

(52) U.S. Cl. ............. 348/61; 381/92; 381/56; 382/118; 367/135

(58) Field of Classification Search ........... 348/14
See application file for complete search history.

(56) References Cited

U.S. PATENT DOCUMENTS

| 4,837,832 | A | * | 6/1989 | Fanshel | 381/317 |
| 5,051,964 | A | * | 9/1991 | Sasaki | 367/135 |
| 5,357,578 | A | * | 10/1994 | Taniishi | 381/354 |
| 5,404,406 | A | * | 4/1995 | Fuchigami et al. | 381/17 |
| 5,600,727 | A | * | 2/1997 | Sibbald et al. | 381/26 |
| 5,619,582 | A | * | 4/1997 | Oltman et al. | 381/82 |
| 2001/0029449 | A1 | * | 10/2001 | Tsurufuji et al. | 704/226 |
| 2003/0059061 | A1 | * | 3/2003 | Tsuji et al. | 381/92 |
| 2003/0108334 | A1 | * | 6/2003 | Nevenka et al. | 386/95 |
| 2003/0169907 | A1 | * | 9/2003 | Edwards et al. | 382/118 |
| 2006/0062401 | A1 | * | 3/2006 | Neervoort et al. | 381/82 |
| 2007/0223710 | A1 | * | 9/2007 | Laurie et al. | 381/56 |

* cited by examiner

*Primary Examiner* — Christopher S Kelley
*Assistant Examiner* — Hee-Yong Kim

(57) ABSTRACT

A system of microphones, signal processors, and loudspeakers provides enhanced comprehension of speech in noisy social events where the locations of participants are relatively constrained. Speech enhancement comprises both boosting sounds moderately at higher frequencies and delaying them to match the arrival of sounds directly from speakers. Virtual loudspeakers create the illusion for each listener that the boosted sounds come from the vicinity of each talker. Video cameras determine the head positions and facing directions of participants. Subgroups of participants having at least temporary conversational affinities can be identified. Such subgroups may overlap and change. Speech from talking participants is picked up by directional microphones and filtered, sorted, and relayed selectively via loudspeakers to listening participants identified as subgroup members, reinforcing and enhancing the naturally heard speech. More weight can be given to enhancing speech between affined participants. Either conventional or parametric loudspeakers may be used.

13 Claims, 16 Drawing Sheets

PARTICIPANT AUDIO ENHANCEMENT SYSTEM

CROSS-REFERENCES TO RELATED APPLICATIONS

This application claims the benefit of U.S. provisional patent application No. 61/205,047 filed 14 Jan. 2009 as "Participant Audio Enhancement System", which is incorporated herein by reference in its entirety.

STATEMENT REGARDING FEDERALLY SPONSORED RESEARCH AND DEVELOPMENT

There is and was no federally sponsored research and development.

BACKGROUND

This invention relates to enhancing aural communication and conversational interaction among and between persons in social situations, such as those surrounding a table.

Participants sitting or arrayed around a table frequently have trouble hearing and conversing with other participants beyond the most nearby neighbors seated to either side. Background noise due to other speakers in the room, and room reverberations and various additional external sources conspire to drown out normal speech. Lower-frequency sounds (or speech components) predominantly mask higher frequency sounds and speech, reducing intelligibility. Older participants are particularly affected as their ability to hear higher frequency sounds is often diminished or lost. One aspect of such an environment is the "cocktail party effect," wherein a group of talkers instinctively raise their individual acoustic outputs above normal conversational levels in order to overcome the perceived background level, which is often dominated by reverberant sound. Another aspect of the cocktail party effect is the ability of listeners to focus in on a particular talker in the presence of background sound.

A number of previous techniques have attempted to remedy various shortcomings. One previous technique involves feeding suitably and multiply delayed versions of an electronic acoustic signal to two spaced loudspeakers to produce the illusion to a listener that the sounds emanate from a third, "phantom" location. The listener is assumed to be on a line perpendicular to the midpoint between the spaced loudspeakers to face that midpoint. Another previous technique teaches reproducing a stereophonic signal pair through a pair of spaced loudspeakers that simulate a pair of widely-spaced virtual or phantom loudspeakers placed at or near the optimum locations for conventionally spaced stereo loudspeakers. The spaced loudspeakers may be surprisingly close together, which relaxes accuracy requirements on knowing a listeners head position. Several other previous techniques involve parametric loudspeakers, face and facial feature detection and tracking, and techniques using two cameras to locate and track a single listener's head using triangulation and skin color for the purpose of enhancing virtual stereophonic sound reproduction.

None of the previous techniques suitably address the problems discussed above. The foregoing examples of the related art and limitations related therewith are intended to be illustrative and not exclusive. Other limitations of the related art will become apparent upon a reading of the specification and a study of the drawings.

SUMMARY

An array of outward facing directional microphones is placed towards the center of the table or around its rim, or placed amongst several conversation participants. Speech sounds collected by those microphones are processed or filtered to selectively or favorably relay them to loudspeakers substantially on opposite sides of the table to enhance, replace or reinforce the natural sounds from all speakers heard directly by each and every listener. In the simplest embodiment, the relayed sounds are merely filtered to enhance higher-frequency components, boosted in strength and time shifted (delayed) to arrive substantially in expected synchronization with the natural sounds or speech heard directly from the speaker. The components of natural speech heard well are the lower frequency components that are also the primary contributors to masking. Thus the filtered sounds replace the masked sounds without substantially increasing overall masking effects.

However, as human listeners tend to face a speaker to help overcome the "cocktail party effect" and improve hearability, our enhanced preferred embodiment uses virtual sound source synthesis means to create illusions in listeners' minds that the relayed sounds emanate from the vicinities of the talkers being paid attention to. This requires tracking the position and orientation of each participants head. The positions of the heads of participants of a physically constrained social situation such as being seated at a table and the directions they are facing at any particular time are detected by analyzing image frames collected by a video camera substantially located in the center of the table and having a hemispheric or panoramic 360° azimuthal field of view. The analysis comprises conventional face detection and facial feature recognition means, and the dynamic, time-changing affinities of participants for conversational subgroups are calculated. That is, visual clues are used to determine who is mostly talking to whom.

Both conventional and parametric loudspeakers can be used to create virtual sources. Parametric loudspeakers provide the advantage of low spillover and less addition to the back ground noise. A number of physical embodiments are possible, including a self contained table centerpiece, table rim mounted microphones and loudspeakers, and a suspended "chandelier" unit. In the preferred embodiment separate video and audio digital processors operate in parallel, although the processing functions could be supported by a single physical processor. In some alternative embodiments these processors are physically separated and communicate via wireless links. Personal communications devices are used as remote microphones in another alternative embodiment. In certain alternatives microphones and loudspeakers are "loose" elements whose positions are not predetermined and may change. Their locations are continuously registered using psychoacoustically inaudible sounds transmitted from auxiliary and the primary loudspeakers in the enhancement system. For elongated tables, where a single system would not function well, participant acoustic enhancement system coverage can be expanded by adding additional audio and video control units, in a master-slave configuration.

Objects and Advantages

Unlike the prior art, whose objectives are to enhance the stereophonic sound reproduction, where sounds are emanate from an assembly of spatially distributed sources, the objective of our invention is to enhance the hearability and intelligibility of conversational speech from each single source, or talker, in a group. That is, instead of producing the aural illusion of a spread-out acoustic environment, we want to do the opposite, and narrow the apparent sources of sound. This results in the significant advantage of enhancing to ability of participants in certain social environments to interact with one another even though they may not be in close physical proximity to one another.

Still further objects and advantages will become apparent from a consideration of the ensuing description and accompanying drawings.

DRAWING FIGURES

Figure 5A:
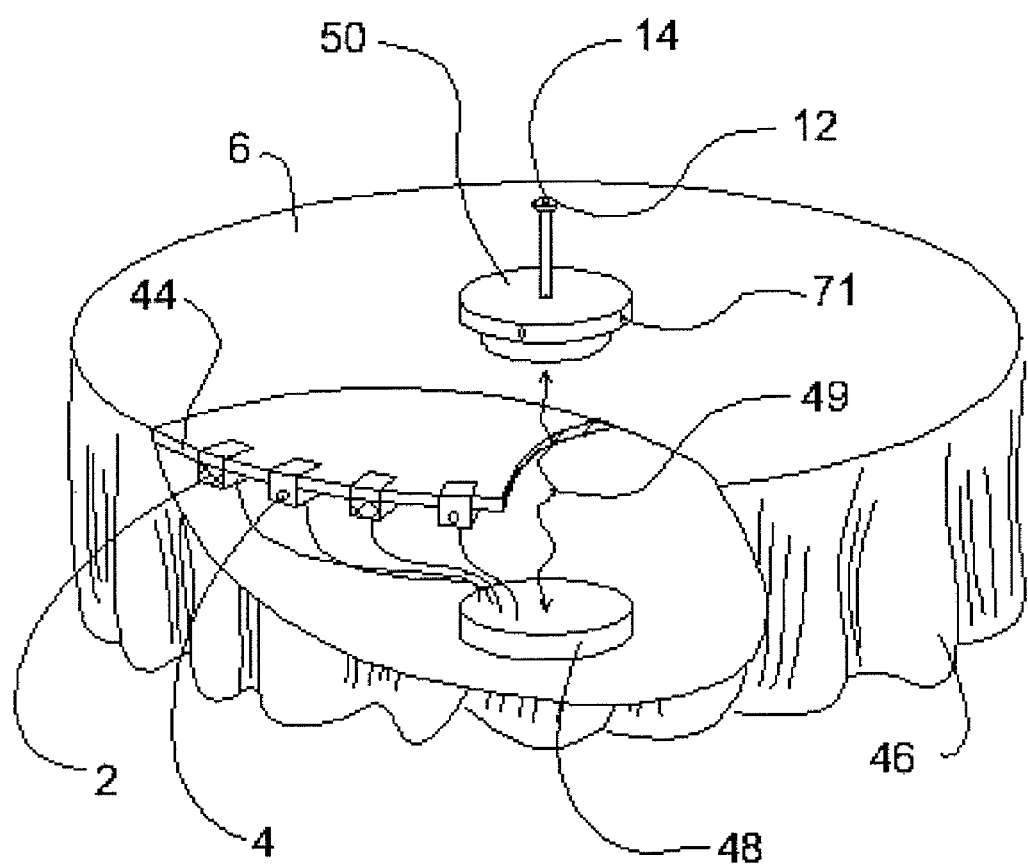

FIG. 5A presents an alternative embodiment.

Figure 5B:
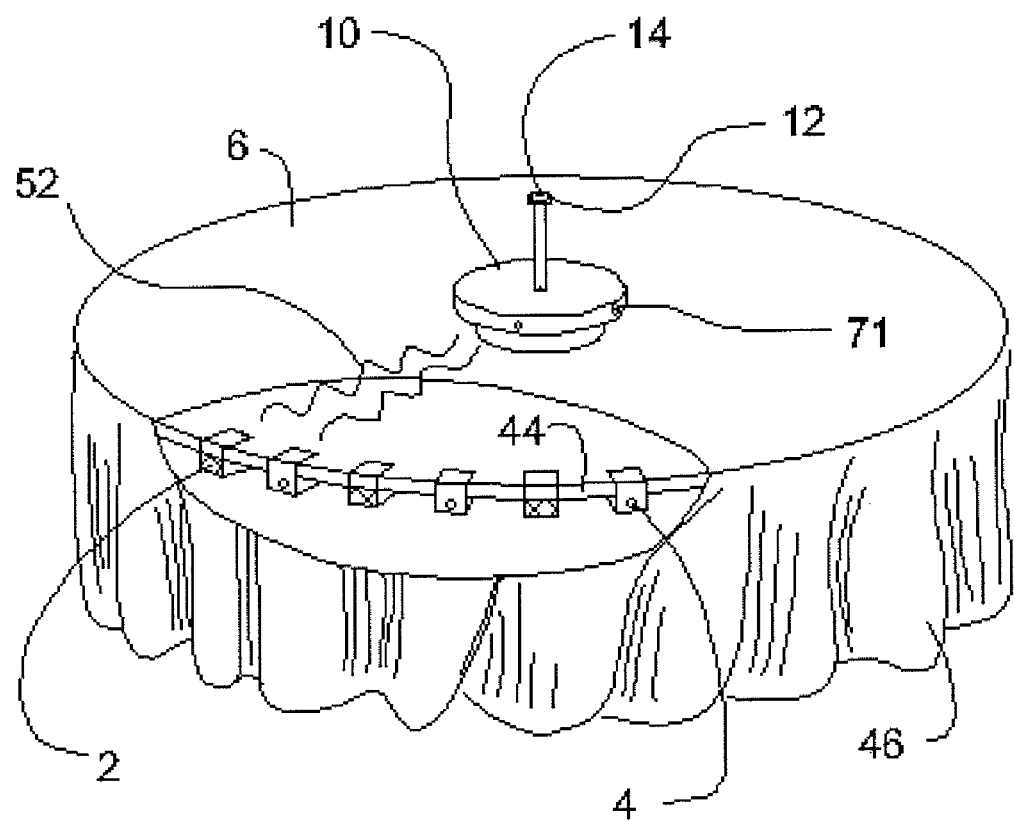

FIG. 5B presents another alternative embodiment.

Figure 5C:
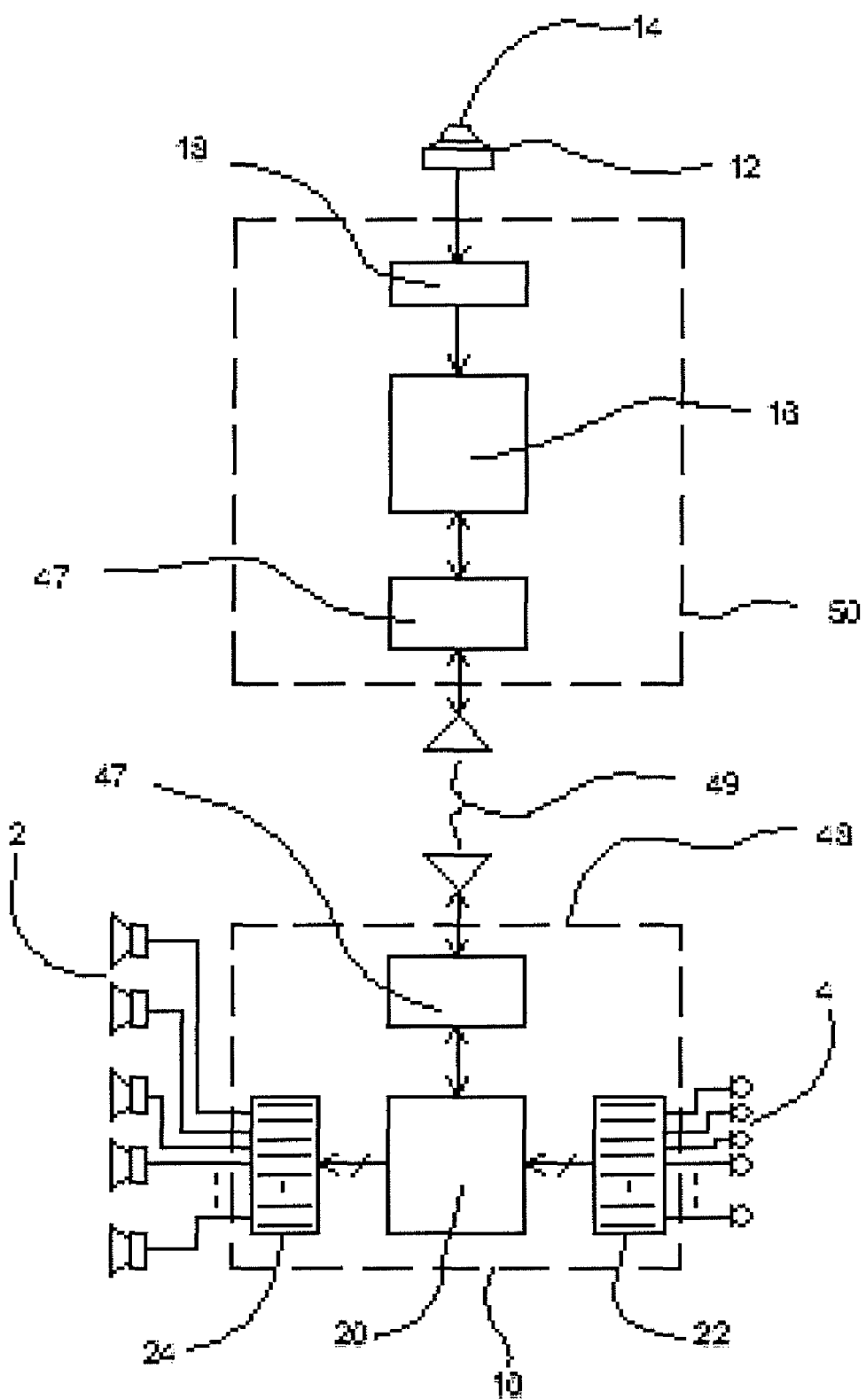

FIG. 5C is the block diagram of an alternative embodiment.

Figure 5D:
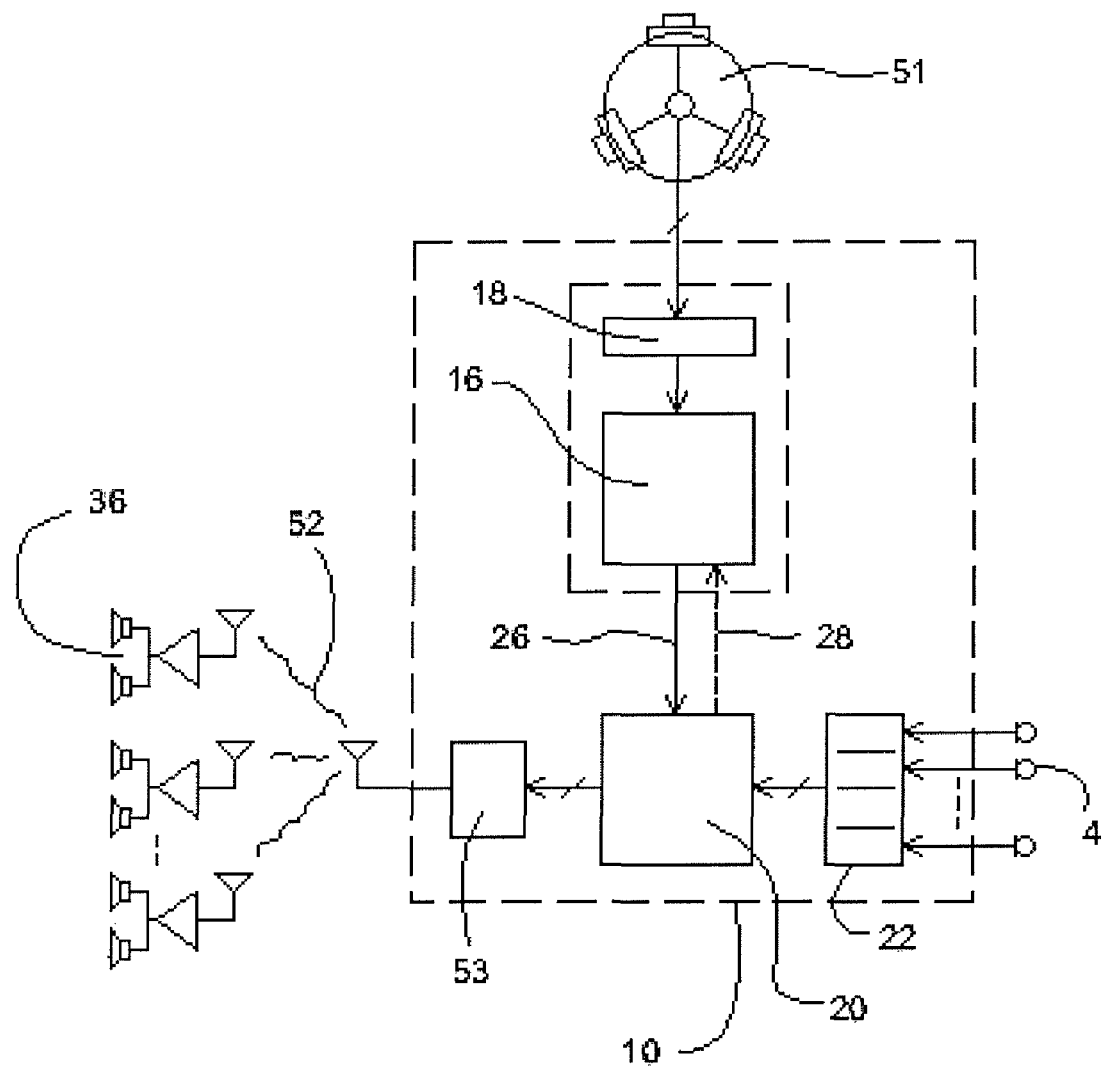

FIG. 5D is the block diagram of an alternative embodiment.

Figure 6A:
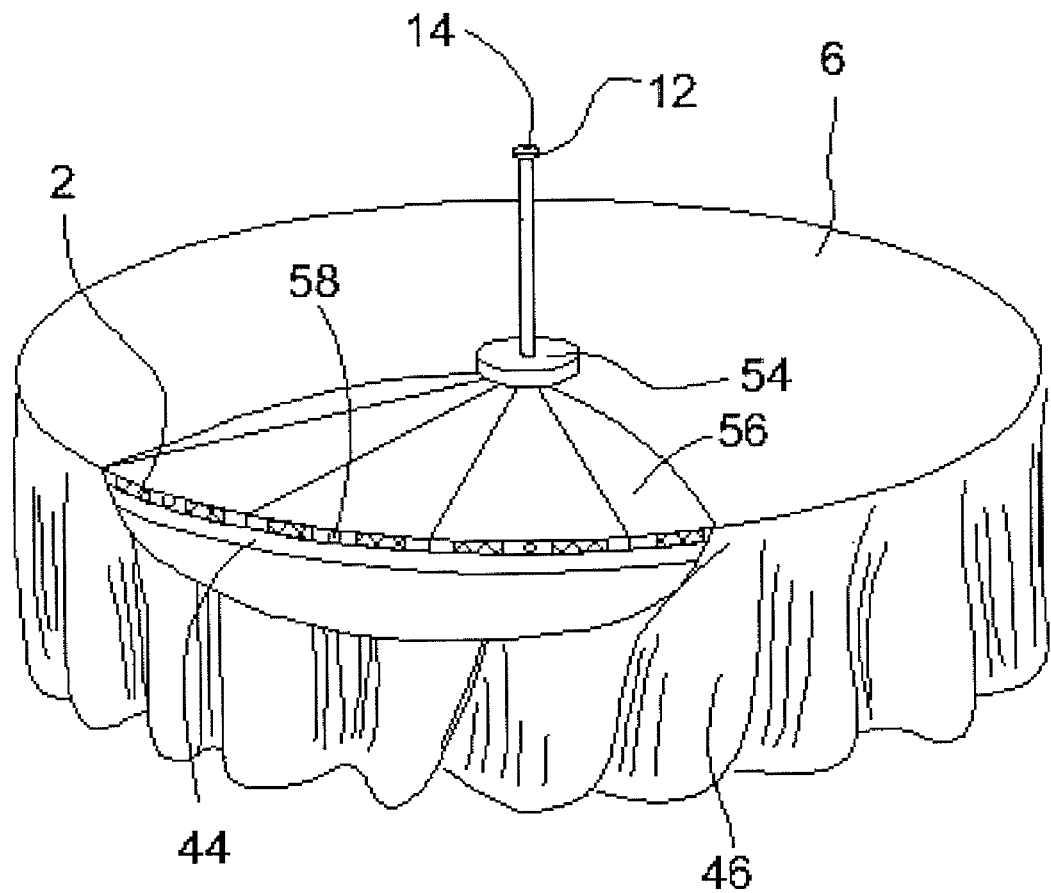

FIG. 6A is a perspective view of another alternative embodiment.

Figure 6B:
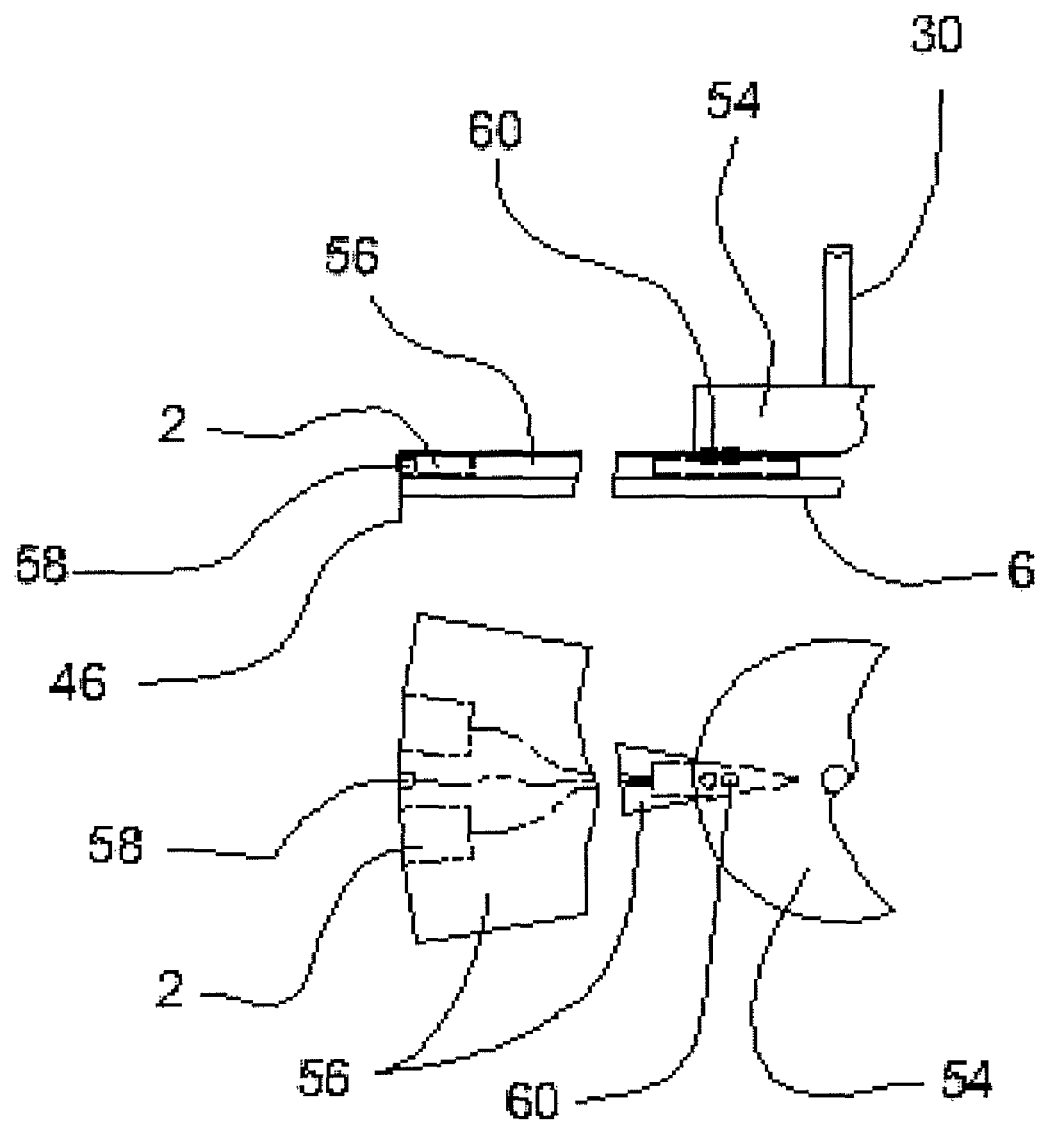

FIG. 6B shows some details of the system illustrated in FIG. 6A.

Figure 7:
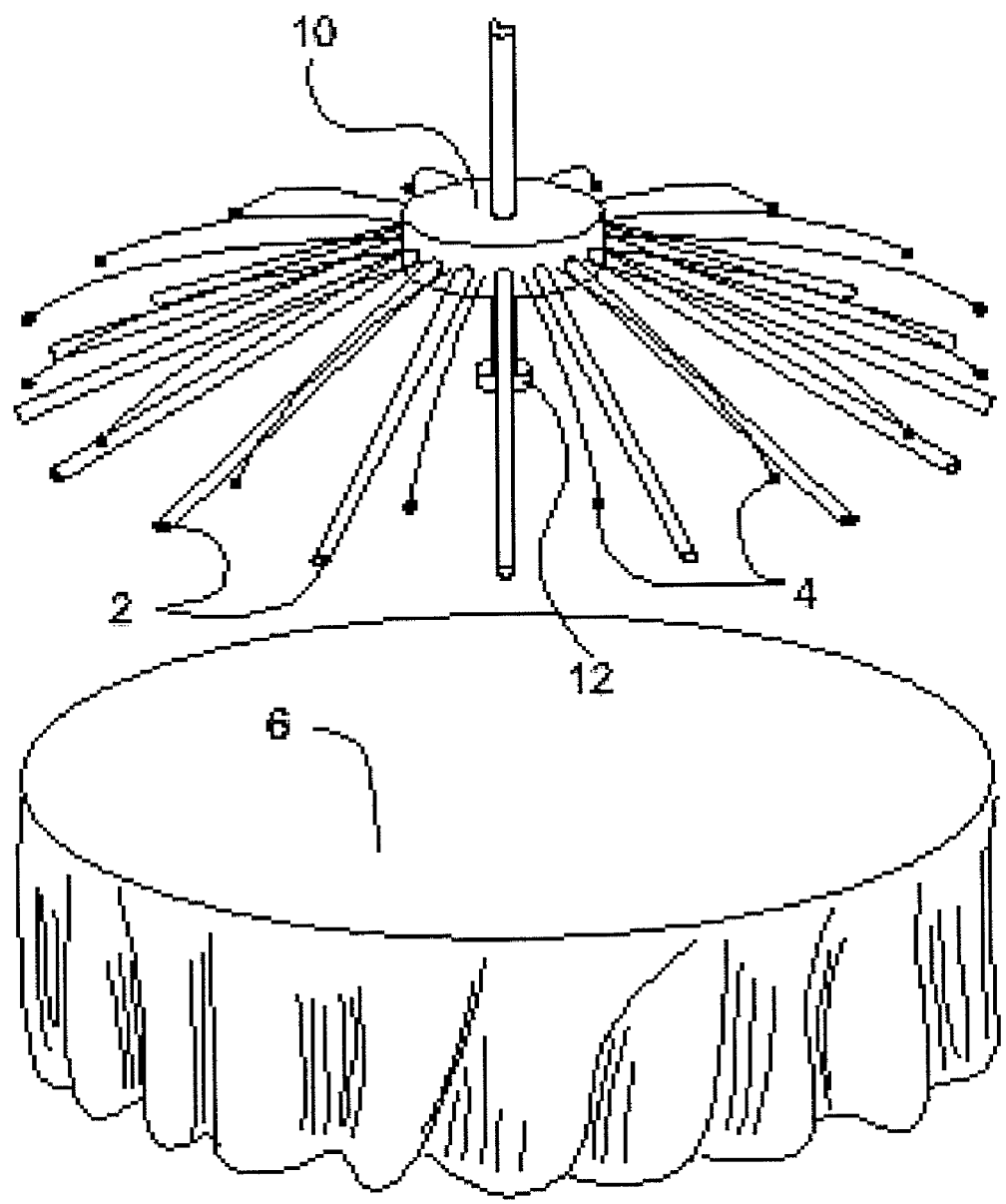

FIG. 7 is a perspective view of a further embodiment.

Figure 8:
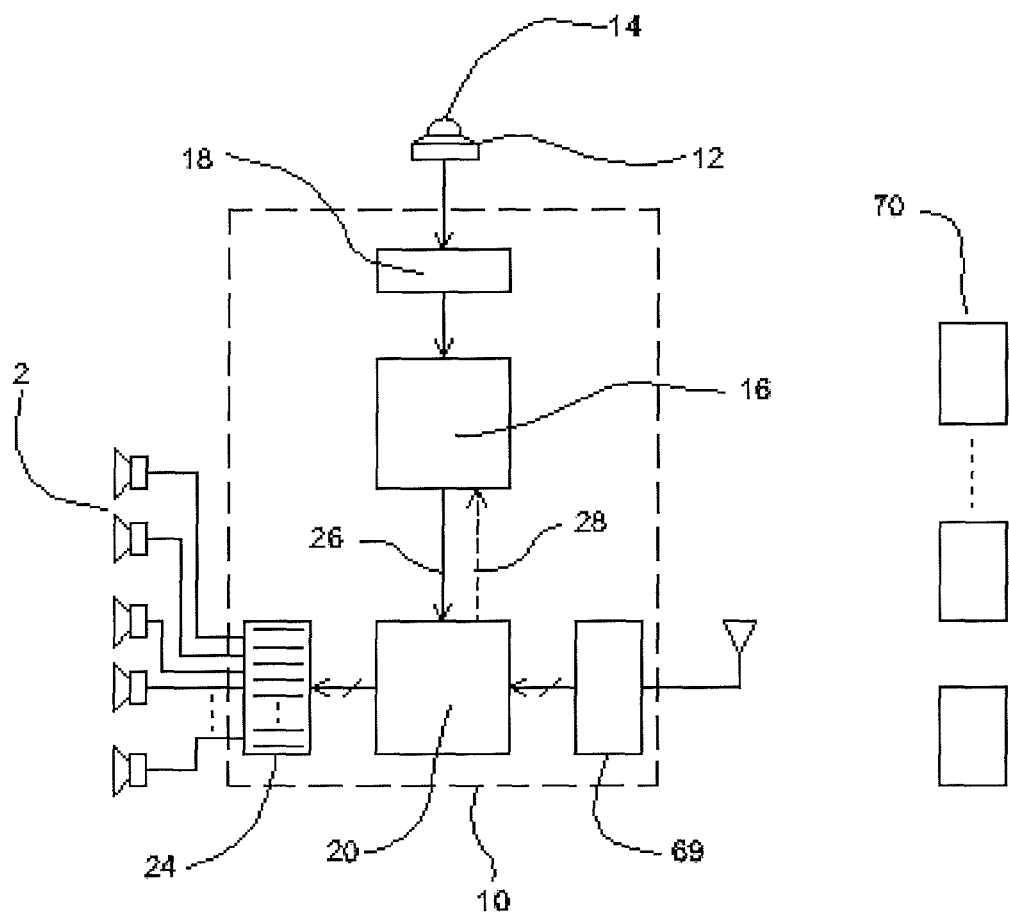

FIG. 8 is a block diagram with personal communications devices.

Figure 9:
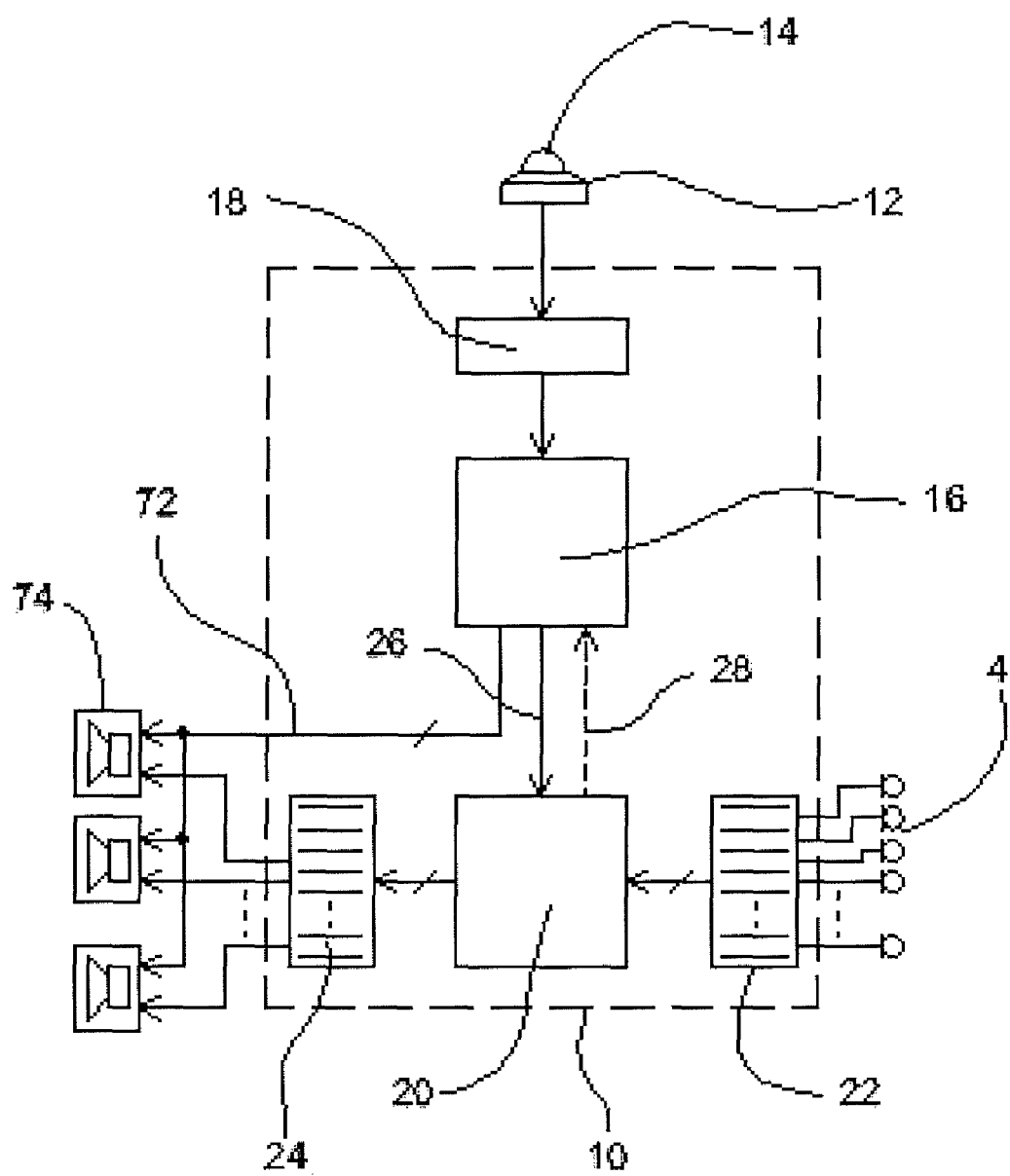

FIG. 9 is a block diagram with parametric loudspeakers.

Figure 10:
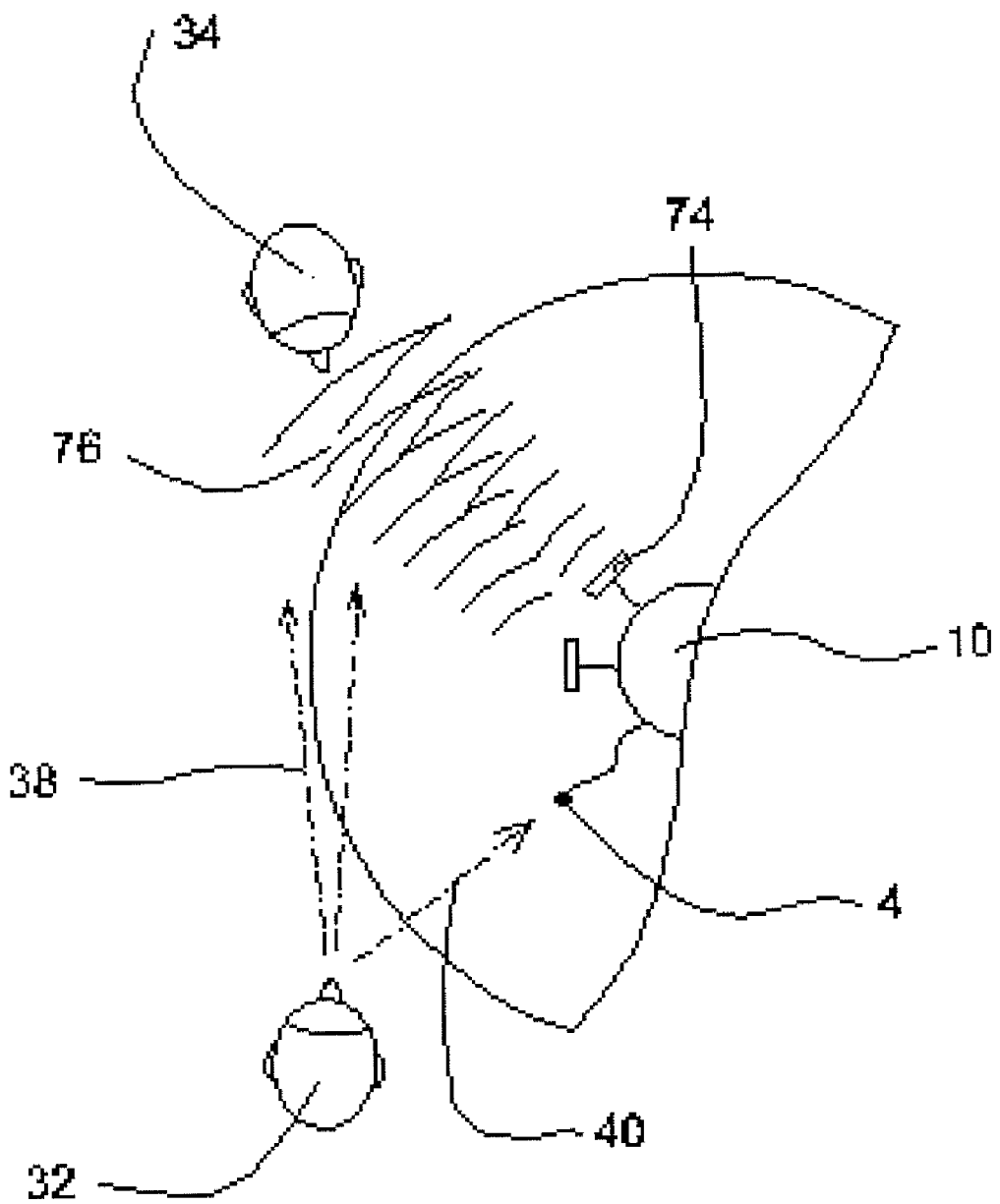

FIG. 10 depicts a parametric loudspeaker system for virtual sound sources.

Figure 11:
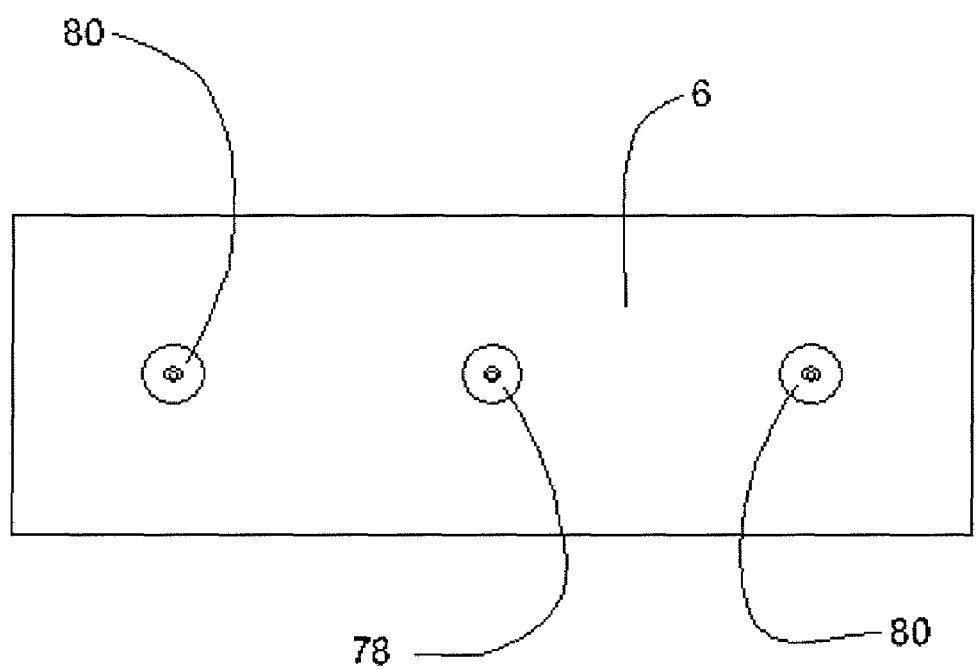

FIG. 11 is a plan view of a table showing multiple control units.

REFERENCE NUMERALS IN DRAWINGS

| | |
|---|---|
| 2 loudspeaker unit | 4 unidirectional microphone |
| 6 table | 8 participants |
| 10 control unit | 12 camera |
| 14 fish-eye lens | 15 ribbon cable |
| 16 digital video processor | 17 contact plate |
| 18 video frame grabber | 20 digital audio processor |
| 22 multi-channel ADC | 24 multi-channel DAC/driver |
| 26 data path | 28 optional data path |
| 30 centerpiece | 31 right ear |
| 32 talker | 33 left ear |
| 34 listener | 36 loudspeaker pair |
| 38 direct sound paths | 40 microphone sound path |
| 42 true sound paths | 44 table rim |
| 46 table cover | 47 wireless data link terminal |
| 48 audio processing unit | 49 wireless data link |
| 50 video processing unit | 51 panoramic camera |
| 52 wireless drive links | 53 wireless drive link terminal |
| 54 control unit | 56 table pad |
| 58 flush mounted microphone | 60 end terminal |
| 69 wireless network adapter | 70 personal comm. device |
| 71 auxiliary microphone | 72 beam steering signals |
| 74 parametric loudspeaker units | 76 ultrasonic beams |
| 78 master control unit | 80 slave unit |

DETAILED DESCRIPTION OF THE INVENTION

Figure 1:
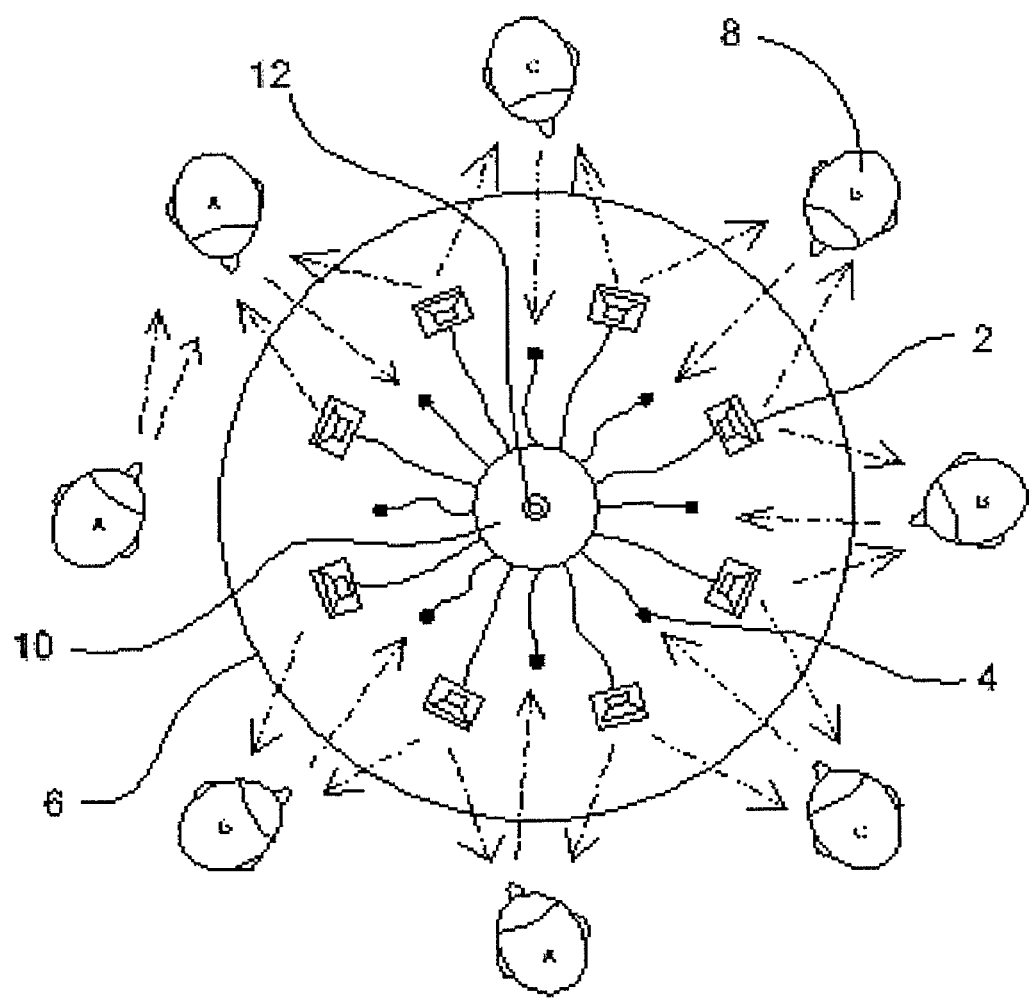
FIG. 1 illustrates the basic layout of an embodiment of the invention.

FIG. 1 shows the basic layout of one embodiment of our invention. Loudspeaker units 2 and unidirectional microphones 4 are arrayed substantially around the center of table 6. Participants 8 are normally seated around table 6, although they may exchange positions or be temporarily or permanently absent. Table 6 can have any shape, including round (as depicted), square, rectangular, oval, polygonal, etc. The locations of participants 8 can be arbitrary, although their individual distances from the center of table 6 are at least relatively well known, as they may be assumed reasonably to be sitting normally at the table. Notably, the use of a table in this detailed description is meant to be illustrative, and not limiting. As such, in various embodiments participants 8 may be seated or standing in a region that does not include a table; i.e. a region that is empty or that contains other things. For example, participants 8 may be seated or standing in an empty area, or may be seated on couches facing each other, etc. FIG. 1 also illustrates sub-groupings of participants 8, labeled as "A", "B", and "C".

Loudspeaker units 2 may contain or comprise single loudspeakers, multiple loudspeakers, or arrays of loudspeakers, or comprise loudspeaker pairs arranged to form virtual or "phantom" loudspeakers. In addition, loudspeaker units 2 may be "parametric" loudspeakers that employ ultrasonic beams to produce audible sounds through nonlinear interactions with air, and may further be arrayed to form parametric virtual loudspeakers. Loudspeaker units 2 are aimed substantially outward from the center or rim of table 6.

Unidirectional microphones 4 preferably have cardioid or hypercardioid response patterns to reduce sound pickup from the sides and rear, and are also aimed substantially outward from the center of table 6 so as to selectively sense speech from the nearest participants 8.

Loudspeaker units 2 and unidirectional microphones 4 are connected to control unit 10, which is placed substantially in the center of table 6. The connections between units 2 and microphones 4 and control unit 10 may be made using wires or electronic cables or, alternatively, may be wireless links. In one embodiment, the system may be permanently installed on table 6, while in another embodiment the system may be configured for portable use or for temporary use.

Figure 2:
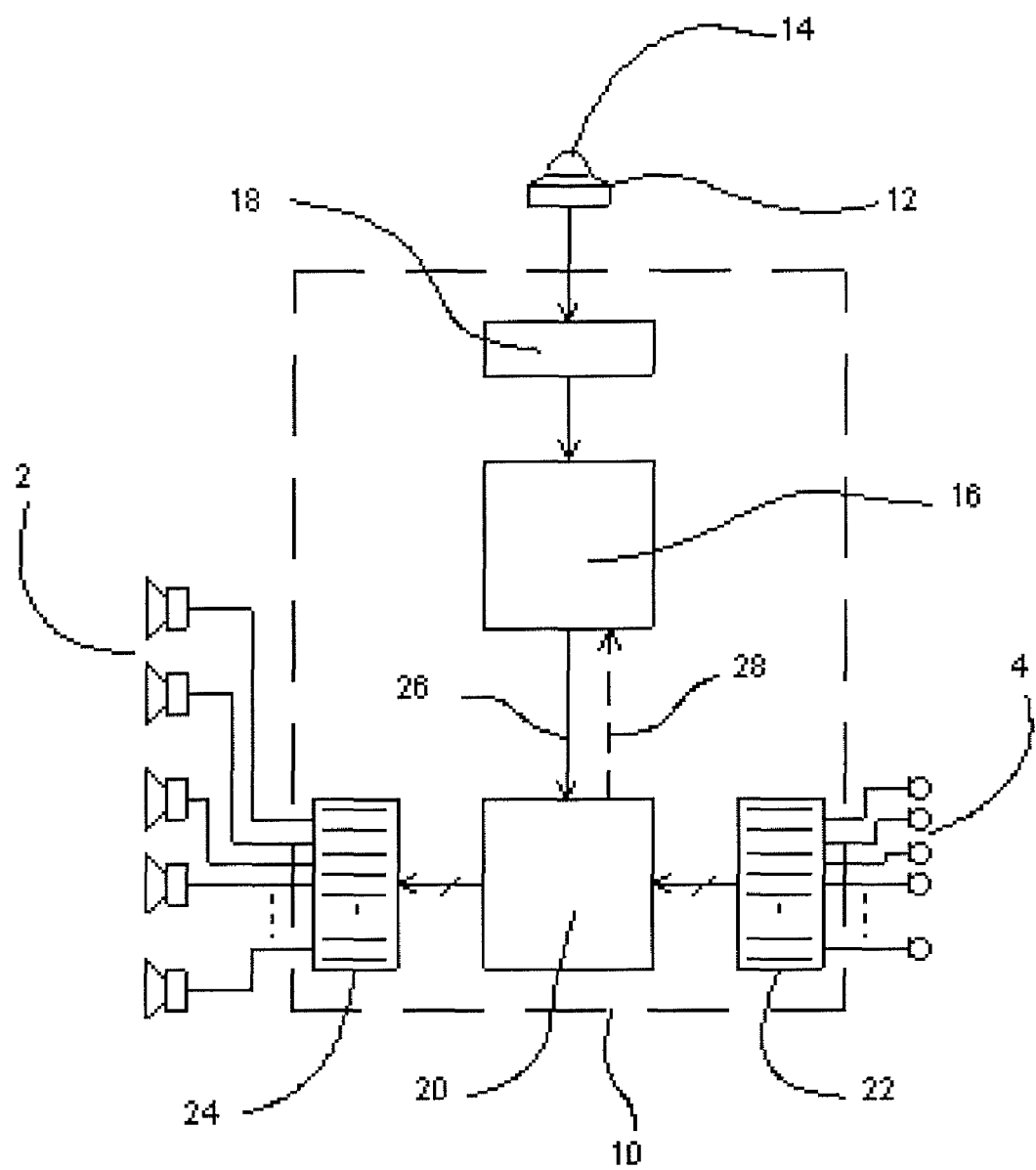
FIG. 2 is a block diagram of the preferred embodiment.

FIG. 2 is a block diagram of the enhanced preferred embodiment of the invented system, which includes the optional video processing subsystem. In this embodiment control unit 10 comprises video digital processor 16, frame grabber 18, audio digital processor 20, multichannel ADC 22, and multichannel DAC/speaker driver 24. Control unit 10 also mounts optional video camera 12. Preferably, camera 12 employs a fish-eye lens 14 and is pointed substantially vertically on order to produce a substantially hemispherical image with 360° azimuthal coverage. Alternatively, camera 12 is a system comprising three or more individual cameras whose individual images may be electronically stitched together to produce a single 360° panoramic image.

Video processor 16 continuously or substantially continuously extracts participants' head position and orientation and passes this information to audio processor 20 via data path 26. This information is used to calculate the appropriate time delays required for synchronizing sounds arriving at the listeners with sounds heard directly from the participating speakers. Alternatively, in the simplest embodiment, these time delays may be estimated without knowledge of actual participants' locations, merely by inferring where participants are likely to be. In addition, knowledge of participants' locations may be used to implement advanced signal processing steps, such as those required to synthesize a "phantom" speaker. Audio processor 20 accepts digitized signals picked up by microphones 4, processes said signals, and directs them as required to DAC/driver 24. Each output channel from DAC/driver 24 may contain audio information intended for one or more participants 8 or to be directed towards locations where participants may be reasonably expected to be.

In general, the preferred embodiment depicted in FIGS. 1 and 2 basically operates by picking up speech sounds from a talking participant on one side of table 6, filtering the sounds and relaying them with appropriate time shifts or delays and amplification to the participants substantially on the other side of the table from the talker. All participants may be talkers, perhaps simultaneously, and their speech can be directed at subgroups of possible listeners, including individual participants or the entire group.

Figure 3:
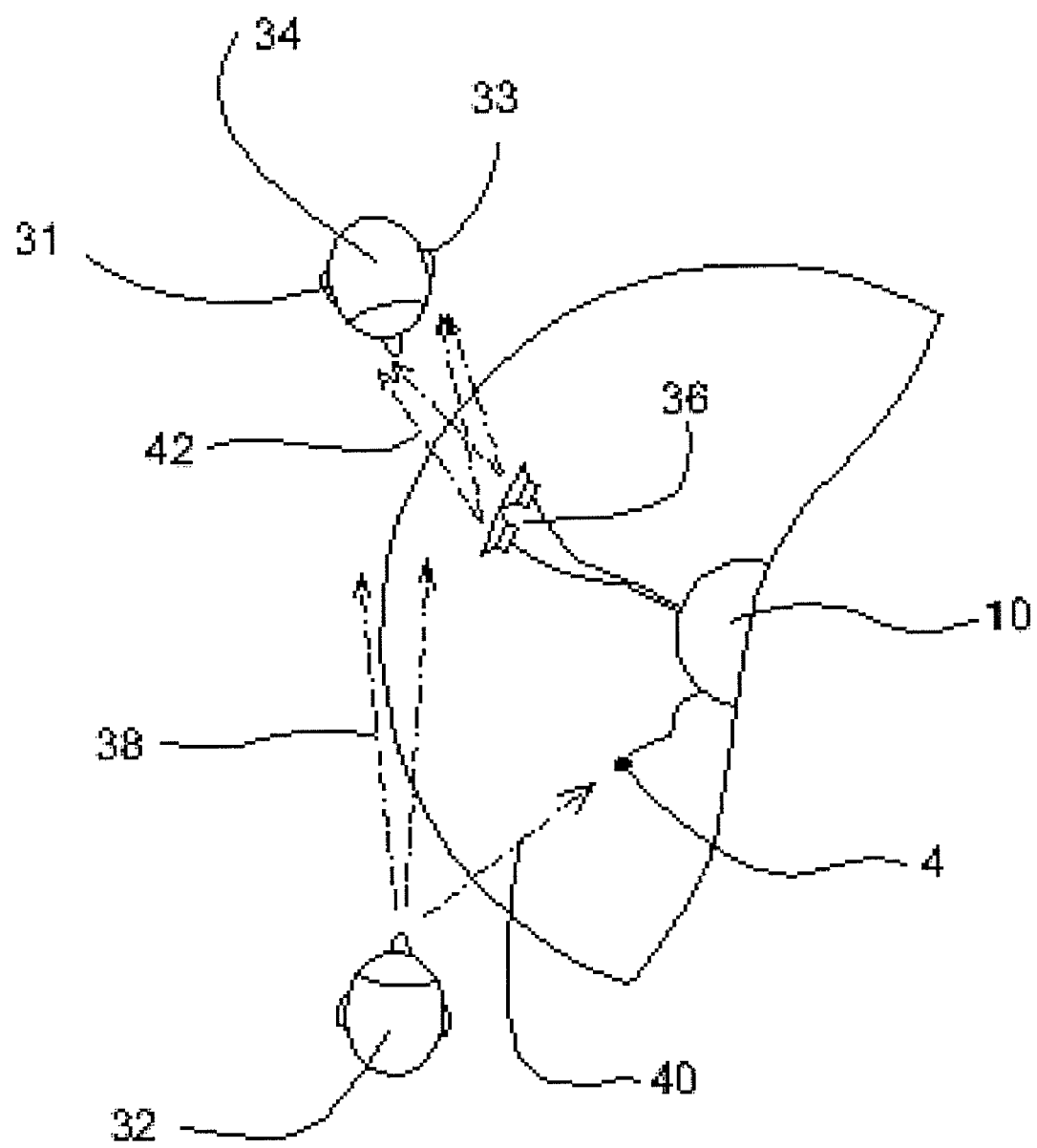
FIG. 3 depicts the primary direct sound paths for a virtual sound source.

A listener, of course, will hear some speech sounds coming directly from a speaker, especially the lower frequency components. Optimally, the augmented sounds are timed to reinforce the real ones and/or are more intense than the real ones, at least in specified frequency bands, thus enhancing the ability of a listener to hear a speaker in a noisy background environment. Simply filtering and adjusting the time delays between sounds picked up by microphones 4 and radiated by loudspeaker units 2 and modestly boosting (3-10 dB) them will substantially improve the intelligibility of a conversation across or around a table. To enhance speech intelligibility, sound bandwidths should be significantly narrower than those used for hi-fi or stereo music reproduction. FM radio and television sound channels span 30 Hz to 15 kHz, CD audio covers 20 Hz to 20 kHz, professional, and audiophile audio 20 Hz to above 22 kHz. A bandwidth of 300-3400 Hz is often used in telephony, but a reproduced speech bandwidth of 200-7000 Hz can markedly reduce fatigue, improve concentration, and increase intelligibility. Human ear sensitivity peaks at a frequency of about 3300 Hz, and the speech articulation index, which is a measure of intelligibility, increases some 25% when the band is extended from 3.4 to 7 kHz, although most of the improvement occurs below 5 kHz. Most masking of speech by background noise occurs above 500 Hz, so that lower-frequency speech sounds traveling along direct paths 38 of FIG. 3 are not strongly affected. Furthermore, narrower bandwidths simplify the synthesis of convincing virtual sound sources. In our preferred embodiment, we choose to employ a sound channel band extending from 500 Hz to 5 kHz for enhancing intelligibility. It is not necessary, however, to use this entire band for enhancing the ability to understand speech. Satisfactory performance may be had merely by augmenting speech components above 1-2 kHz.

However, our invention also goes beyond simply adjusting time delays. In an alternative embodiment, we extend the virtual or phantom source concept to encompass arbitrary listener position and head orientation. Images from optional camera 12 are analyzed using methods well understood by knowledgeable workers in the field of face and facial feature recognition and tracking (computer applications to do this are commercially readily available from a multiplicity of vendors) to extract both the estimated head position of each and every participant 8 relative to table 6 and the approximate direction each and every participant 8 is facing. Such methods typically employ skin detection as a starting point. Because the locations of participants around table 6 are relatively constrained (e.g., by the nature of being seated around a table) and therefore reasonably accurately known, two- or three-dimensional methods such triangulation and trilateration that require two or more well-spaced cameras as taught in some of the prior art are not necessary. The angular position of every participant around table 6 is extracted from the angular position of the images of his or her head in the hemispheric images captured by frame grabber 18 with respect to a predetermined reference axis (not shown). This process is simplified by the fact that participants 8 are unlikely to block one another in the field of view of camera 12, and if they happen to, there is little or no practical consequence. Non-participants, such as persons not seated reasonably closely around table 6 and in the background scene, may be discriminated against on the basis of relative or expected face and head size. Advanced eye- or pupil-tracking means may also be employed to assist determination of which direction each participant 8 is looking as well as facing.

For simplicity in the purpose of this description, FIG. 3 depicts the basic arrangement in which at some instance in time there is one participant talker 32, one participant listener 34, and one loudspeaker pair 36. There are a multiplicity of direct, or primary, sound paths, including paths 38 from talker 32 to the ears of listener 34, path 40 from talker 32 to a microphone 4, and paths 42 from loudspeaker pair 36 to the right ear 31 and left ear 33 of listener 34. Microphone 4 may be selected as the closest to talker 32, or, optionally, selected using position information from video processor 16 combined with audio data from processor 20 to provide the optimum virtual source illusion. In a further option, sounds received by a multiplicity of microphones 4 may be combined using methods known to workers familiar with that art to synthesize sounds from talker 32 that would be received by a virtual or "phantom" microphone at a known location, which would be used in place of sounds received by a physical microphone 4. Associated listeners 34 all tend to face talker 32 (in order to hear him or her), while talker 32 may switch frequently between perceived listeners. However, since there is only one primary sound path from the talker to the closest microphone 4, the orientation of talker's 32 head is relatively less important than that of listeners 34. Audio processor 20 will actually process simultaneously sounds from a multiplicity of participants 8 and distribute said sounds to all other participants, although not necessarily with equal strength, by synthesizing a virtual sound source at or in the vicinity of each talker 32 appropriate for every potential listener 34. Thus each listener 34 will hear the direct sounds along paths 38 plus the sounds passing along paths 42 that are sensed to emanate from talker 32 and also seem to pass along paths 38.

An important aspect of our invention is the dynamic association of individual participants to subgroups. Subgroups may overlap, so an individual participant could be associated by video processor 16 to one or more subgroups. Different demographic groups, for example teenagers and retirees, are liable to have different group dynamics. In addition, group dynamics are subject to change with time. Therefore processor 16 continuously collects information on how long participants appear to pay attention to each other, how often they apparently switch allegiances, and adjusts the distribution and weighting of sounds received by microphones 4 to loudspeaker units 2 accordingly. Participants may be assigned a time-variable "affinity index" that depends on his or her apparent association with one or more subgroups, including no subgroup.

Referring again to FIG. 3, we see that the lengths of sound paths 38, 40, and 42 can be calculated preferably by video processor 16 from the known or estimated positions of talker 32, listener 34, loudspeaker pairs 36, and microphone 4, plus the facing direction of listener 34, relative to control unit 10. Optionally, these lengths can be calculated by audio processor 20 or by processors 16 and 20 together. In a further option, the functions of processors 16 and 20 may be combined into a single physical digital processor (not shown). Note that pairs of loudspeakers 36 need not be contiguous—adjacent or nearby pairs may overlap. Once the lengths of sound paths 38, 40, and 42 are calculated, processor 20 synthesizes a virtual sound source located at or substantially close to the location of talker 32 using methods known to workers in the field, such as a method whereby a series of delayed and diminishing and polarity reversing versions of the digitized outputs of microphone 4 are summed and transmitted to loudspeaker pair 36. According to one embodiment of the present invention there need be no restrictions on the position and facing direction of listener 34, and the virtual source can be located at talker 32.

Figure 4A:
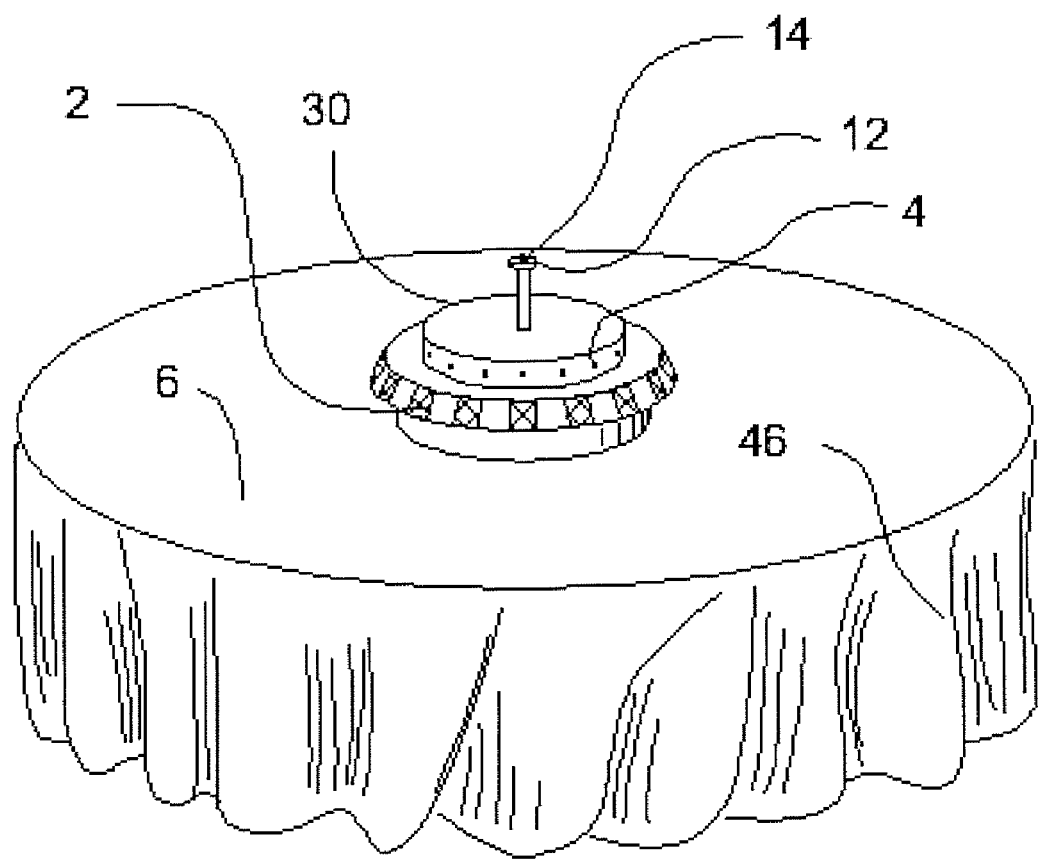
FIG. 4A is a perspective of the preferred embodiment.

FIG. 4A depicts an alternative embodiment of our invented participant acoustic enhancement system wherein control unit 10, camera 12, microphones 4, and loudspeaker units 36 are all contained in or supported on or by table centerpiece 30. Optional data link 28, depicted in FIG. 2, passes any auxiliary participant position information extracted by audio processor 20. Such information may be obtained by correlating the sounds received at two or more microphones 4 and determining relative time-of-arrival offsets and relative sound intensities. This information may be used to assist locating participants 8 and to help verify their actual existences. Additionally, this information may be used to determine the shape of table 6 with respect to control unit 10. In a further option, correlation or other signal analysis means may be employed to cancel acoustic pickup by microphones 4 from adjacent or nearby loudspeakers 2. In this embodiment the angular positions of loudspeakers 2 and microphones 4 are well defined and the choice of a reference axis is straightforward and trivial. Preferably, our invented system is battery operated using rechargeable batteries and is controlled only by a simple on-off switch, requiring no other operator interaction.

Figure 4B:
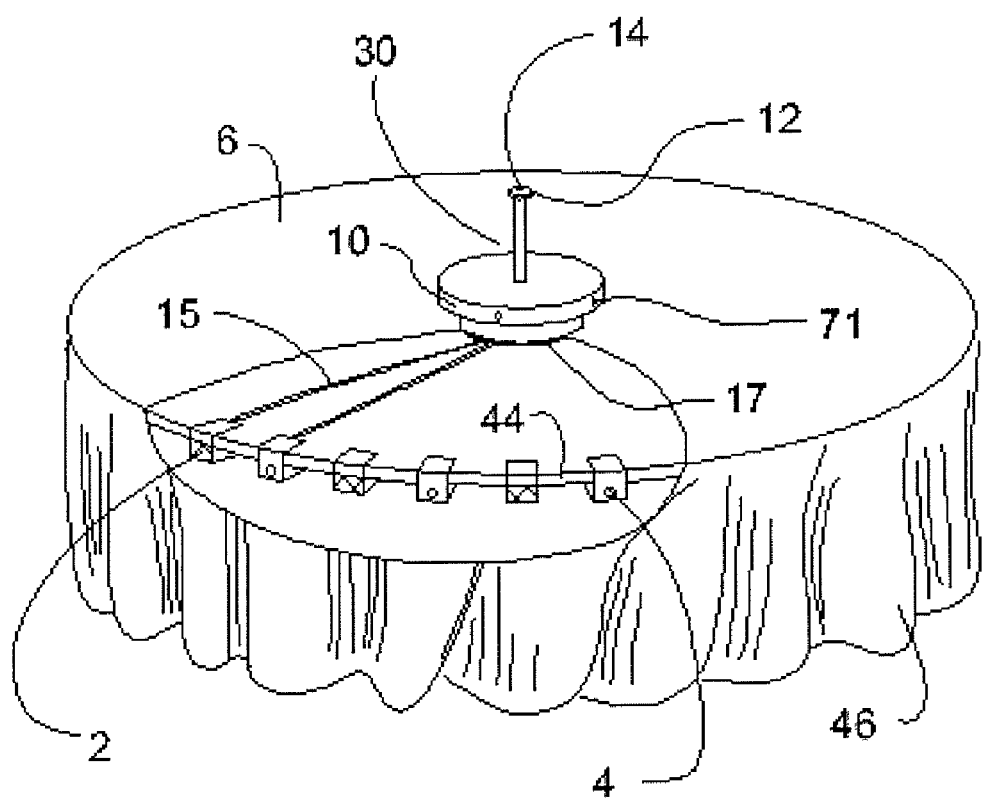
FIG. 4B is a perspective view of an alternative embodiment.

FIG. 4B depicts a further alternative embodiment wherein loudspeaker units 2 (or loudspeaker pairs 36) and microphones 4 are mounted or clipped to the rim 44 of table 6 under table cover 46, which may be a tablecloth or a tablecloth-overlay combination. Because the table cover 46 will attenuate sounds to degree determined by the porosity and other sound transmission and absorption factors of the cloth, so more intense loudspeaker output requirements are expected. However, in this alternative embodiment the relatively shorter sound path lengths between participants 8 and loudspeakers 36 and microphones 4 at least partially compensate for sound attenuation by table coverings. Ribbon cables 15 under table cover 46 connect to contact plate 17 which is also underneath cover 46. Electrical contacts (not shown) on top of contact plate 17 and underneath the base of centerpiece 30 penetrate cover 46 to complete the electrical circuits between control unit 10 and loudspeaker pairs 36 and microphones 4.

FIGS. 5A and 5B present alternative embodiments wherein loudspeaker units 2 (or loudspeaker pairs 36) and microphones 4 are also mounted or clipped to the rim 44 of table 6 under table cover 46. In these alternative embodiments it is convenient to divide and separate the functions of control unit 10 into its video and audio processing aspects and to connect them via wireless data links.

In FIG. 5A audio processing unit 48 is placed under table 6 and is hard-wired to loudspeakers 36 and microphones 4. Video processing unit 50 is contained in centerpiece 30 and communicates with audio processing unit 48 via wireless signal path 49. FIG. 5C is a block diagram of this optional version of this alternative embodiment. Here, wireless link 49 connects processing units 48 and 50.

In FIG. 5B both the video and audio processing functions are supported by control unit 10, which is similar to control unit 10 of FIG. 4B, for example, except that that wireless data links 52 transmit signals to loudspeaker units 36 and from microphones 4. In this embodiment, wireless data links 52 are preferably radio-frequency links. FIG. 5D presents a block diagram corresponding to this optional version of this alternative embodiment. In addition, FIG. 5D illustrates the further option wherein the images produced by three cameras 51 are stitched together to produce a single 360° panoramic view.

Yet another alternative embodiment is illustrated in FIG. 6A, wherein loudspeaker units 2 and flush mounted microphones 58 are built into table pads 56. Centerpiece 30 will now contain control unit 54. Because table pad 56 may extend under centerpiece 30, end terminals 60 of wireless data links 52 may be spaced closely apart, as illustrated in FIG. 6B. Links 52 can be implemented optionally as radio-frequency, inductively coupled, capacitive, acoustic, optical/infrared links, or even direct electrical contacts penetrating table cover 46. Link terminals 60 in close proximity to one another transmit and receive data through table cover 46. Very small loudspeakers or sound-emitting apertures are required for this alternative embodiment because table pads 56 are desirably very thin, yet acoustic energy must radiated efficiently and significant audio distortion avoided.

A further alternative embodiment is depicted in FIG. 7, which is essentially an "upside down" version of the preferred embodiment. Here, participant acoustic enhancement system 68 comprising control unit 10, camera 12, loudspeaker units 2, and unidirectional microphones 4 are suspended from the ceiling much as a chandelier substantially above the center of table 6. Participant acoustic enhancement system 68 may be disguised as or configured into an actual chandelier with the addition of lamps and can be utilized for permanent instead of portable or temporary setups as are the previously described preferred and alternative embodiments of our invention. In this embodiment operating power may be supplied from the electrical mains.

In an even further alternative microphones 4 and 58 are replaced by personal communications devices such as iPhones or Bluetooth enabled mobile telephones that can be configured to join a local or peer-to-peer network established by control unit 10 in the preferred embodiment or the equivalent in the other presented and possible alternative embodiments so as to pick up talkers' 32 speech and transmit each to control unit 10 or equivalent. FIG. 8 is a block diagram illustrating this alternative, with wireless network adapter 69 and personal communication devices 70. Not all participants desire or need to use personal communication devices, and a further alternative (not shown) optionally accommodates a mixture of microphones 4 or 58 and personal communication devices 70.

It is apparent in the alternative embodiments depicted in FIGS. 5A-C, FIG. 8, and, to some degree, FIG. 6A-B, that "loose" elements comprising loudspeaker units 2, microphones 4, loudspeaker pairs 36, personal communication devices 70, etc., can be placed rather arbitrarily, perhaps by accident, and therefore need to be registered with respect to a reference axis set by control unit 10 or its equivalent. Thus another aspect of our invented participant acoustic enhancement system is the ability to self-register those loose elements. Registration is accomplished by means of producing and radiating, preferably continuously, wideband (or, short effective duration) audio signals that are psychoacoustically inaudible to humans, from loudspeaker units 2, etc. Such inaudible signals are known to practitioners familiar with that art. Referring back to FIGS. 5A and 5B, each loudspeaker 2 radiates a distinct psychoacoustically inaudible signal that is received by three or more auxiliary microphones 71 on control unit 10 or 50. Said distinct inaudible signals may be radiated sequentially or, if encoded, simultaneously. The arrival times of the distinctly encoded signals at auxiliary microphones 71 are extracted by audio processor 20, from which the azimuth and distance to each loudspeaker 2 can readily be calculated or deduced relative to a pre-established reference axis. Once the placement order and locations of loudspeakers 2 are determined, the locations of the remaining loose elements comprising microphones 4 and personal communication devices 70 can then be deduced by similarly extracting the arrival times of inaudible sounds from loudspeakers 2 at microphones 4 or personal communications devices 70. Optionally, auxiliary loudspeakers (not shown) mounted on control units 10 in place of auxiliary microphones 71 also radiate inaudible and distinctly encoded signals. Then the azimuths of and distances to microphones 4 and personal communications devices 70 are determined by measuring the arrival times of those sounds by those devices, in an analogous process to that described above. Continuing the analogy, the locations of loudspeakers 2 are then deduced by measuring arrival times of inaudible sounds received by microphones 4 and personal communications devices 70 from loudspeakers 2.

In the preferred embodiments disclosed above in connection with FIGS. 2 and 4 and the alternative embodiment presented in FIG. 7, pairs of loudspeakers in units 2 are employed to synthesize virtual or phantom sound sources coincident with the locations of participants 8. In both of these embodiments, parametric speakers that use ultrasonic carrier beams can replace the conventional loudspeakers in units 2. Furthermore, a pair of parametric speakers can also produce simultaneously multiple virtual sources, and a multiplicity of parametric speakers can produce an even larger set of virtual sources. Parametric loudspeakers take advantage of inherent nonlinearities in sound propagation in air wherein powerful ultrasonic beams, typically in the 100-200 kHz frequency band, act as carriers of the desired audio-frequency sounds, which are modulated by means analogous to those employed by radio-wave transmission and broadcast, including amplitude (AM), single sideband (SSB), phase (PM), and frequency (FM) modulation means. Nonlinear phenomena associated with the response of air to pressure fluctuations act to self-demodulate the desired sounds. Ultrasonic beams can be narrowly focused and readily steered, and the demodulated audio also has those narrow beam features, allowing sounds to be beamed narrowly towards individual chosen participants 8. This provides the advantage of reducing sound spill-over and hence minimizing any increase in background sound level.

FIG. 9 is a block diagram of an alternative system to that of FIG. 2 that employs parametric loudspeakers. In this embodiment, video processor 16 also produces a multiplicity of beam steering signals 72 sent to parametric loudspeaker units 74, which each produce one or more appropriately modulated beams directed towards participants 8. Parametric loudspeakers typically employ a multiplicity of individual radiating elements (not shown) that can be phased in a manner or pattern analogous to that used for phased array radars to steer the beam. Furthermore, multiple beams may be produced simultaneously merely by superimposing more the one set of driving signals with different phasing patterns. An aspect and novel feature of our invention is the beaming of one or more beams from a parametric loudspeaker towards participants 8. Each set of driving signals can further carry a distinct sound modulation, intended for specific participants 8.

Referring now to FIG. 10, in a further option parametric loudspeaker techniques are combined with the virtual or phantom source synthesis techniques described above in connection with FIG. 3. Ultrasonic beams 76 emanating from parametric loudspeaker units 74 are directed toward listener 34, who would normally sense the demodulated sounds as coming from units 74. By modifying and filtering the audio signals as described in connection with FIG. 3 that are used to modulate beams 76, the illusion is produced whereby the source of the demodulated sounds is coincident with talker 32, which enhances intelligibility.

Our invented participant acoustic enhancement system performs optimally when table 6 is not greatly elongated and has length-to-width ratios less than about 2. FIG. 11 depicts a means for expanding the system to accommodate longer tables, by using one master control unit 78 and one or more slave units 80. Notably, and as stated previously, the use of a table in this detailed description is meant to be illustrative, and not limiting. Units 78 and 80 communicate by wired or wireless means and can be any of the embodiments described above. Furthermore, the locations of slave units 80 may be registered also as described above by means of auxiliary microphones 71 or the analogous use of auxiliary loudspeakers. Because units 78 and 80 are in view of each other, optical registration means may be used as well. Such optical means include temporal, spatial, wavelength (color) encoding, or any combination of these.

Conclusions, Ramifications, and Scope

Accordingly, it can be seen that we have provided a method and apparatus for enhancing the ability of participants in a social environment such as around as table to participate in conversations around and across the table in the presence of background noise that would render conversation beyond immediate neighbors difficult or impossible.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

We claim:

1. A table-centric system for dynamically facilitating audible conversation among a plurality of potential participants in one or more conversations around the table, the system distinct from and independent of any potential or actual participants, comprising:
   a plurality of directional microphones, configured to receive sounds from the potential participants;
   a plurality of loudspeakers configured to transmit sounds to the potential participants;
   an automatic means for identifying and locating the potential participants; and
   a control unit, coupled to the microphones, to the loudspeakers and to the identification means, the control unit configured to dynamically identify, without intervention from any participants, one or more subgroups from the plurality of potential participants, each of the one or more subgroups including at least two participants;
   for each subgroup identified by the control unit, the control unit performing the following without intervention from any participants:
      dynamically locating a first participant within a specific subgroup;
      dynamically locating one or more second participants within the specific subgroup;
      utilizing microphones to capture sound from the first participant;
      processing the captured sound to generate a specific enhanced sound for each second participant;

utilizing loudspeakers to deliver the specific enhanced sound to the second participants, the specific enhanced sound operable to improve audible conversation intelligibility of the first participant as heard by the second participants.

2. The table-centric system for dynamically facilitating audible conversation as recited in claim 1, wherein the system is:
- suspended above the table,
- a self-contained centerpiece placed upon the table,
- built in to the table, or
- coupled to the table.

3. The table-centric system for dynamically facilitating audible conversation as recited in claim 1, wherein when the specific enhanced sound is a reinforcement sound operable to augment speech sounds masked by background noise.

4. The table-centric system for dynamically facilitating audible conversation as recited in claim 3, wherein the specific enhanced sound is high-pass filtered sound.

5. The table-centric system for dynamically facilitating audible conversation as recited in claim 1, wherein the means for identifying and locating the potential participants is a video camera.

6. The table-centric system for dynamically facilitating audible conversation as recited in claim 5, wherein utilizing the video camera includes using a means of recognition to distinguish a potential participant.

7. The table-centric system for dynamically facilitating audible conversation as recited in claim 5, wherein the first participant is identified as being a talking participant and the one or more second participants are identified as being listening participants.

8. The table-centric system for dynamically facilitating audible conversation as recited in claim 7, wherein:
- a subgroup can simultaneously have more than one identified talking participant,
- a participant may dynamically change from being a talking participant to being a listening participant,
- a participant can be a member of more than one identified subgroup,
- participants in one identified subgroup may dynamically change to be members of another identified subgroup, or
- a subgroup may comprise the entire group of potential participants.

9. The table-centric system for dynamically facilitating audible conversation as recited in claim 1, wherein the means for identifying and locating potential participants is based on predetermining the approximate locations of the potential participants according to the expected spacing between persons seated or standing around the perimeter of the table.

10. The table-centric system for dynamically facilitating audible conversation as recited in claim 1, wherein capturing includes combining sounds received by a multiplicity of microphones.

11. The table-centric system for dynamically facilitating audible conversation as recited in claim 1, wherein utilizing the plurality of loudspeakers includes generating a virtual sound source or using a means for producing a virtual sound.

12. The table-centric system for dynamically facilitating audible conversation as recited in claim 1, wherein the control unit further performs registering a specific microphone and a specific loudspeaker for each participant utilizing audio signals that are psychoacoustically Inaudible to the plurality of participants.

13. The table-centric system for dynamically facilitating audible conversation as recited in claim 1, wherein the specific enhanced sound is timed to arrive substantially no earlier than the first natural sound from the first participant as heard by a second participant.

* * * * *